United States Patent
Iyengar et al.

(10) Patent No.: US 11,303,533 B2
(45) Date of Patent: Apr. 12, 2022

(54) SELF-HEALING FABRICS

(71) Applicant: Cisco Technology, Inc., San Jose, CA (US)

(72) Inventors: Praveen P. Iyengar, San Jose, CA (US); Srinivas Pitta, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 16/506,907

(22) Filed: Jul. 9, 2019

(65) Prior Publication Data

US 2021/0014127 A1    Jan. 14, 2021

(51) Int. Cl.
| | |
|---|---|
| *H04L 12/24* | (2006.01) |
| *H04L 41/147* | (2022.01) |
| *H04L 41/082* | (2022.01) |
| *H04L 41/142* | (2022.01) |
| *H04L 41/0686* | (2022.01) |
| *H04L 41/12* | (2022.01) |

(52) U.S. Cl.
CPC ........ *H04L 41/147* (2013.01); *H04L 41/0686* (2013.01); *H04L 41/082* (2013.01); *H04L 41/12* (2013.01); *H04L 41/142* (2013.01)

(58) Field of Classification Search
CPC ... H04L 41/147; H04L 41/082; H04L 41/142; H04L 41/12
See application file for complete search history.

(56) References Cited

U.S. PATENT DOCUMENTS

| | | |
|---|---|---|
| 4,739,219 A | 4/1988 | Hume |
| 6,446,218 B1 | 9/2002 | D'Souza |

(Continued)

FOREIGN PATENT DOCUMENTS

| | | |
|---|---|---|
| AU | 5776900 A | 1/2001 |
| AU | 2002254037 A1 | 9/2002 |

(Continued)

OTHER PUBLICATIONS

Scheit, O. "Self-Healing in Self-Organizing Networks," Semanticscholar, Aug. 2014, pp. 175-181.

(Continued)

*Primary Examiner* — Nicholas R Taylor
*Assistant Examiner* — Sanjoy Roy
(74) *Attorney, Agent, or Firm* — Patterson + Sheridan, LLP

(57) ABSTRACT

Embodiments herein describe an upgrade system that provides suggestions for upgrades using a confidence metric. In one embodiment, the upgrade system tracks network elements in multiple network fabrics to determine whether an upgrade performed on a first network element was successful. The upgrade system can generate one or more vectors that store various data about the network elements such as enabled features, telemetry data, control plane faults, system settings, locations of the network elements in a fabric, and the like. By evaluating these vectors, the upgrade system can derive a reliability confidence metric regarding the upgrade. If the reliability confidence metric exceeds a threshold, this indicates the upgrade was successful. The upgrade system can then compare vectors for different network elements to determine whether to apply the same upgrade to similar network elements.

20 Claims, 7 Drawing Sheets

(56) References Cited

U.S. PATENT DOCUMENTS

| | | |
|---|---|---|
| 6,453,468 B1 | 9/2002 | D'Souza |
| 6,973,229 B1 | 12/2005 | Tzathas et al. |
| 2002/0165962 A1 | 11/2002 | Alvarez et al. |
| 2002/0174207 A1 | 11/2002 | Battou |
| 2002/0176131 A1 | 11/2002 | Walters et al. |
| 2003/0023709 A1 | 1/2003 | Alvarez et al. |
| 2003/0026525 A1 | 2/2003 | Alvarez |
| 2003/0091267 A1 | 5/2003 | Alvarez et al. |
| 2003/0163555 A1 | 8/2003 | Battou et al. |
| 2005/0259571 A1 | 11/2005 | Battou |
| 2008/0049769 A1* | 2/2008 | Bugenhagen ......... H04L 41/147 370/401 |
| 2010/0299419 A1 | 11/2010 | Ramankutty et al. |
| 2016/0313985 A1 | 10/2016 | Sprygada et al. |
| 2016/0315803 A1 | 10/2016 | Sadana et al. |
| 2017/0228680 A1* | 8/2017 | Atedgi ............... G06Q 10/0639 |
| 2018/0035307 A1* | 2/2018 | Mahimkar ............ H04L 41/147 |
| 2018/0248750 A1 | 8/2018 | Johnston et al. |
| 2019/0089599 A1* | 3/2019 | Savalle .................. H04L 67/34 |
| 2019/0306023 A1* | 10/2019 | Vasseur .................. H04L 41/16 |
| 2020/0379744 A1* | 12/2020 | Bhupati ............... G06F 11/0709 |
| 2021/0014260 A1* | 1/2021 | Singh ..................... H04L 41/22 |

FOREIGN PATENT DOCUMENTS

| | | |
|---|---|---|
| CN | 102077636 A | 5/2011 |
| EP | 2430851 A1 | 3/2012 |
| EP | 3278215 A1 | 2/2018 |
| EP | 3281358 A1 | 2/2018 |
| WO | 0101221 A2 | 1/2001 |
| WO | 02069104 A2 | 9/2002 |
| WO | 2010132884 A1 | 11/2010 |
| WO | 2016172059 A1 | 10/2016 |
| WO | 2016172060 A1 | 10/2016 |
| WO | WO-2020088734 A1 * | 5/2020 ............... G06F 8/65 |

OTHER PUBLICATIONS

U.S. Appl. No. 16/281,405, "Identifying Locations and Causes of Network Faults,", filed Feb. 21, 2019.

U.S. Appl. No. 16/178,679, "Using a Multi-Network Dataset to Overcome Anomaly Detection Cold Starts,", filed Nov. 2, 2018.

* cited by examiner

SELF-HEALING FABRICS

TECHNICAL FIELD

Embodiments presented in this disclosure generally relate to self-healing fabrics and more specifically, to deriving confidence metrics used to apply software or hardware changes to similar network nodes.

BACKGROUND

Many applications require a large network fabric to handle the amount of data they generate. These network fabrics have large and complicated topologies. Upgrading the software and hardware in the network nodes (e.g., switches or routers) forming the network fabrics can introduce unintended consequences. For example, a software update may affect a particular feature used by one fabric that is not used in another fabric, or the specific topology of one fabric may unintentionally throttle customer traffic when the upgrade is performed. These idiosyncrasies often make system administrators hesitate to perform upgrades. For example, a system administrator may be unwilling to upgrade to a new operating system for the switches in the network because she is afraid doing so may cause problems within the network.

Currently, troubleshooting applications can identify problems after they occur. For example, some troubleshooting applications evaluate logs generated on a network device to determine whether the problem the network device experiences is related (or is the same) as a problem experienced by another network device in the fabric. These troubleshooting applications are reactive to a problem in the network and cannot provide any indication whether an upgrade will be successful before it is performed.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
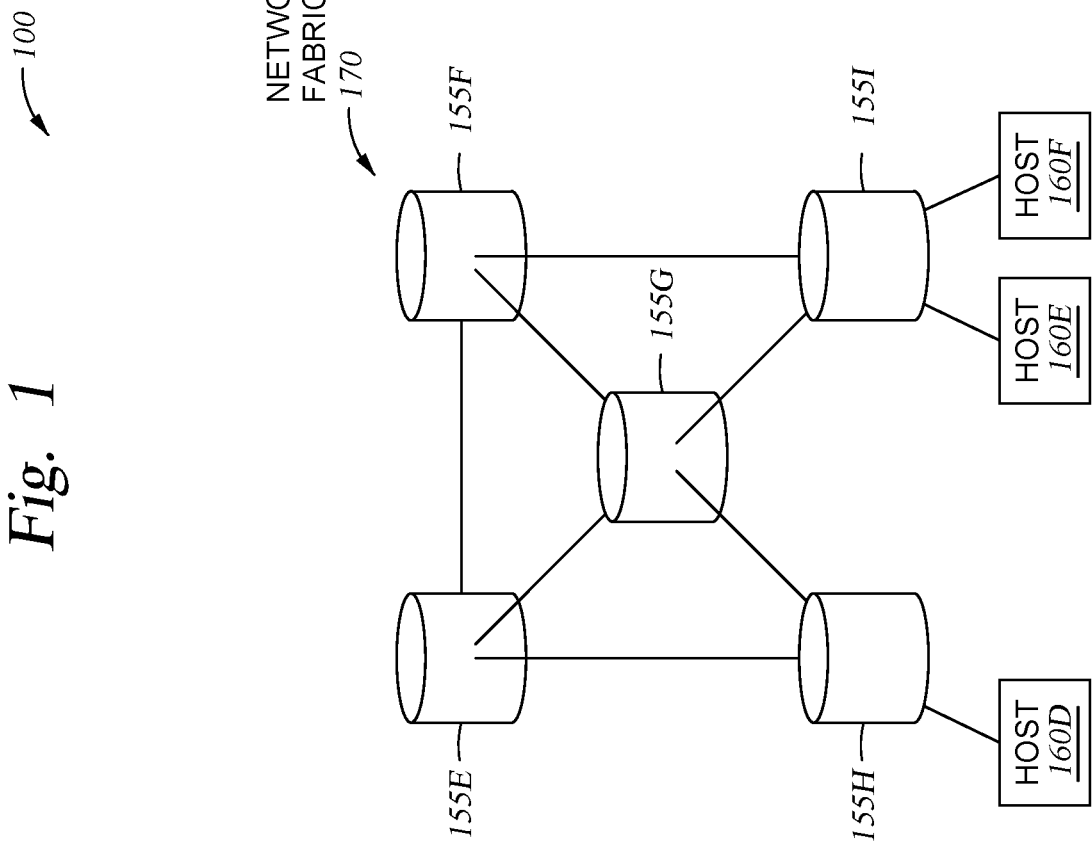
FIG. 1 illustrates a system for providing upgrade suggestions to network elements in multiple network fabrics, according to one embodiment described herein.
Figure 1:
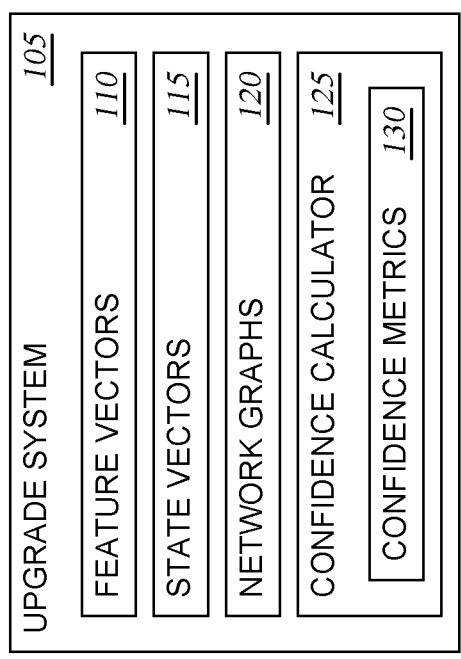

One embodiment presented in this disclosure is a method that includes generating at least one vector for each of a plurality of network elements, wherein each of the at least one vector indicates features enabled in a respective network element and status information of a link coupling the respective network element to a neighboring network element, identifying an upgrade event at a first network element of the plurality of network elements and assigning a confidence metric corresponding to the upgrade event by monitoring the at least one vector of the first network element over time where the confidence metric represents a reliability of the upgrade event. The method also includes determining that the confidence metric satisfies a threshold confidence value, identifying a second network element in the plurality of network elements that is similar to the first network element by comparing the at least one vector of the first network element to the at least one vector of the second network element, and generating a suggestion to perform the upgrade event on the second network element.

Another embodiment described herein is a system that includes a first fabric comprising a first plurality of interconnected network elements, a second fabric comprising a second plurality of interconnected network elements, and an upgrade system configured to generate at least one vector for each of the first and second pluralities of interconnected network elements where each of the at least one vector indicates features enabled in a respective network element and status information of a link coupling the respective network element to a neighboring network element and identify an upgrade event at a first network element of the first plurality of interconnected network elements. The upgrade system also is configured to assign a confidence metric corresponding to the upgrade event by monitoring the at least one vector of the first network element over time where the confidence metric represents a reliability of the upgrade event, determine that the confidence metric satisfies a threshold confidence value, identify a second network element in the second plurality of interconnected network elements that is similar to the first network element by comparing the at least one vector of the first network element to the at least one vector of the second network element, and generate a suggestion to perform the upgrade event on the second network element.

EXAMPLE EMBODIMENTS

Embodiments herein describe an upgrade system that provides suggestions for upgrades using a confidence metric. In one embodiment, the upgrade system tracks network elements in multiple network fabrics to determine whether an upgrade performed on a first network element was successful. The upgrade system can generate one or more vectors that store various data about the network elements such as enabled features, telemetry data, control plane faults, system settings, and the like. These vectors also store the location of the network element in the topology (e.g., connected devices, neighboring devices, edge or core network device, etc.). By evaluating these vectors, the upgrade system can derive a reliability confidence metric regarding the upgrade.

If the reliability confidence metric exceeds a threshold, this indicates the upgrade was successful. The upgrade system can then compare vectors for different network elements to determine whether to apply the same upgrade to similar network elements. For example, whether another network element is experiencing the same problems the network element experienced before the upgrade, whether the location of the network elements in the topology are similar, whether the network devices have similar features enabled (or disabled), and the like. Based on these similarities, the upgrade system can generate another confidence metric (e.g., a similarity confidence metric) predicting the likelihood that performing the upgrade will be beneficial to the other network element (whether it solves a current problem or potential future problem). The upgrade system can display a suggestion for performing the upgrade (as well as the similarity confidence metric) to a system administrator. Alternatively, rather than provide a suggestion, the upgrade system may automatically perform the upgrade if the similarity confidence metric is above a threshold.

FIG. 1 illustrates a system 100 for providing upgrade suggestions to network elements 155 in multiple network fabrics 150, 170, according to one embodiment described herein. The system 100 includes an upgrade system 105 that is communicatively coupled to the network elements 155 in the network fabrics 150 and 170. In one embodiment, the network fabrics 150 and 170 may be two separate fabrics that may be isolated from each other (e.g., two different customer fabrics), or different fabrics for the same customer (e.g., fabrics used by two different applications or for two different geographical regions).

The network elements 155 can include a variety of different network elements such as switches, routers, virtual switches, virtual routers, and the like. The network elements may be physical network devices (e.g., routers or switches) with a network processor and memory, or virtual elements (e.g., virtual devices) executing on a computing device with one or more processor and memory. The network elements 155 are connected to each other and one or more hosts 160 (also referred to as end points). The host 160 may be servers or virtual machines that communicate with the network fabrics 150 and 170.

The upgrade system 105 stores feature vectors 110 and state vectors 115 for the network elements 155 in the fabrics 150 and 170. In one embodiment, the feature vectors 110 identify the features enabled (or disabled) in the network elements 155, the system features of the network element, data plane features, the location and the role of the network element in the fabric, flow priority, information about neighboring network elements, and the like. The state vectors 115 can include data that vary over time such as error rate, traffic drop rate, reset rate, system uptime, bandwidth, memory/processor utilization, telemetry data, and the like. In one embodiment, the upgrade system 105 is part of a software defined networking (SDN) system where the network elements 155 report the information used to populate the feature and state vectors 110, 115 to the upgrade system 105. For example, the upgrade system 105 may be hosted in a cloud-computing environment. Moreover, instead of being stored in the upgrade system 105, in another embodiment, each network element 155 may store its respective feature and state vectors 110, 115.

The upgrade system 105 also stores network graphs 120 that define the topology of the network fabrics 150 and 170.

The upgrade system 105 can use this topology information when deciding whether to suggest a particular upgrade for a particular network element 155. For example, two network elements 155 may have similar enabled features or error rates (as indicated by the feature and state vectors 110, 115) but be located at very different locations within the network graphs 120. As such, the upgrade system 105 may decide not to suggest the same upgrade be performed on both network elements 155 given their different locations.

The upgrade system 105 also includes a confidence calculator 125 that can be a software or firmware application (or a combination of both) that generates confidence metrics 130 using the feature vectors 110, the state vectors 115, and the network graphs 120. While the process for using the confidence metrics 130 is described in more detail later, in general, the upgrade system 105 can use the confidence metrics to identify whether a software or hardware upgrade performed in a first fabric (e.g., a software upgrade to network element 155A in the network fabric 150) should be performed in a different fabric (e.g., network element 155E in the network fabric 170). As mentioned above, a system administrator may be hesitant to perform an upgrade, worried that doing so will cause as many problems as it solves. However, if that upgrade has been performed on network elements 155 in a separate network fabric with positive results, the upgrade system 105 can identify the successful upgrade, determine how closely related the upgraded network elements are related to the network elements in the administrator's fabric (using the feature vectors, state vectors 115, and the network graphs 120), and provide a confidence metric to the system administrator. A high confidence metric can provide the system administrator with the assurance she needs to proceed with the upgrade.

Figure 2:
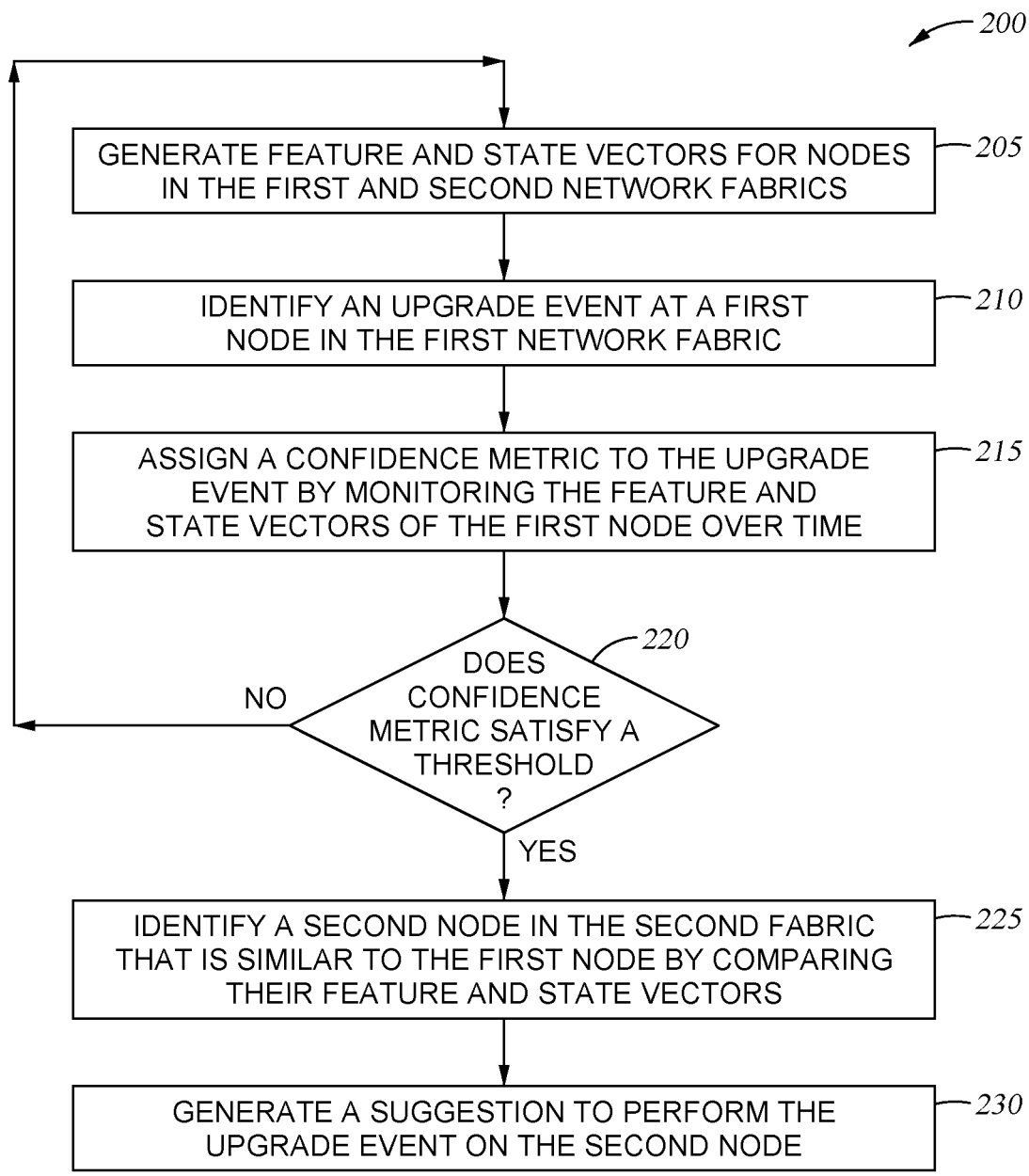
FIG. 2 is a flowchart for suggesting an upgrade using a confidence metric, according to one embodiment described herein.

FIG. 2 is a flowchart of a method 200 for suggesting an upgrade using a confidence metric, according to one embodiment described herein. At block 205, the upgrade system generates feature and state vectors for nodes (e.g., the network elements 155 in FIG. 1) in first and second network fabrics. Although the embodiments herein describe two different vectors, this is not a requirement. The upgrade system could lump the information described below into a single vector (or single data structure) rather than two vectors.

In one embodiment, the feature vectors includes binary information about the node (e.g., is a particular data plane feature or system feature enabled or disabled). The feature vectors can also include static information (or at least information that changes infrequently) such as current operating system (OS) version, hardware information, and location and role of the node in the network fabric. The feature vectors can also include information about neighboring nodes (e.g., a neighboring node or switch that is directly connected to the node) such as the OS version of the neighboring node or its hardware platform. Further, the feature vector can track the number of flows between the node and its neighbors as well as the priority of these flows. This information may be reported once or at intervals to the upgrade system so the that feature vectors can be populated/updated as the underlying network fabric is established or modified.

The state vectors can include information that can change rapidly (or at least is likely to change more rapidly than the information in the feature vectors) such as error rates, failure events, drop rates, and the like. For example, the state vectors may record the system uptime for the node, per-feature error rate, a health status of the node, network processor error rate, traffic drop rate, module/port/network processor reset rate, link protocols (Link Aggregation Control Protocol (LACP) or Bidirectional Forwarding Detection (BFD)) error rate, control plane traffic rate, control plane errors, and the like. The state vector can also include the rate of control failure events transmitted to neighboring nodes (or received for neighboring nodes) and telemetry data. Tracking these neighbor node failures as well as the telemetry data and are discussed in more detail later in FIG. 4.

At block 210, the upgrade system identifies an upgrade event at a first node in the first network fabric. For example, a system administrator (with or without being prompted by the upgrade system) may decide to upgrade the OS version of the first node, or replace a hardware component in the first node. Rather than upgrading a version of the OS, the upgrade event may include a patch or other update to software executing in the first node.

At block 215, the confidence calculator assigns a confidence metric to the upgrade event by monitoring the feature vector, the state vector, or both of the first node over time. For example, confidence calculator may compare the error rates stored in the state vector before the upgrade event occurred to the error and drop rates in the state vector after the upgrade event occurred. The confidence calculator may also compare the overall health status stored in the state vector before and after the upgrade event. The calculator may also consider whether the upgrade event caused an increase or decrease in the number of neighbor node failures in the node neighboring the first node. Further, the confidence calculator can also evaluate information stored in the feature vector such as what features may have changed as a result of the upgrade event.

In one embodiment, the confidence calculator uses the feature and state vectors to generate a reliability confidence metric indicating how successful the upgrade event was on the first node. For example, an upgrade event that results in a decrease in error and drop rates, an increase in the overall health of the first node, a more efficient network processor/memory utilization, or enabling features that previously could not be enabled may result in a more positive reliability confidence metric for the upgrade event. For example, a high percentage reliability confidence metric may indicate that the upgrade event was a positive upgrade that had a beneficial impact on the performance or life cycle of the first node. Conversely, a low percentage reliability confidence metric may indicate the upgrade event had marginal (or detrimental) effect on the performance or life cycle of the first node.

At block 220, the upgrade system determines whether the confidence metric (e.g., the reliability confidence metric) satisfies a threshold. In one embodiment, the threshold represents a minimum confidence that the upgrade system must have that the upgrade was beneficial to the first node. That is, upgrade events with confidence metrics below the threshold may be deemed as marginal or unbeneficial, while upgrade events with confidence metrics at or above the threshold are deemed beneficial to the first node.

If the confidence metric does not satisfy the threshold, the method 200 returns to block 205 where the feature and state vectors may be updated and the upgrade system can wait for another upgrade event. However, if the confidence metric does satisfy the threshold, the method 200 proceeds to block 225 where the upgrade system identifies a second node in the second fabric that is similar to the first node by comparing their feature and state vectors. For example, the upgrade system may compare the feature vectors in the first and second nodes to determine whether they have the same features enabled and disabled (e.g., a certain percentage of the same features), whether they have the same OS version, whether the locations of the nodes in their respective fabrics are similar or dissimilar (e.g., both are at edges of the fabrics, or both are coupled to hosts or only to other switches), whether they have a similar number of flows to other neighboring nodes, and the like. Thus, comparing the feature vectors can identify whether the first and second nodes have similar features as well as whether the nodes have a similar locations or responsibilities in the two fabrics.

In one embodiment, the upgrade system may also evaluate the network graphs of the first and second fabrics. Although the location of the first and second nodes may be stored in one of the vectors, evaluating the network graphs of the fabric may further enable the upgrade system to determine whether a problem experienced by the first node may be the same problem that is currently being experienced (or will likely be experienced) by the second node.

The upgrade system may also compare the state vectors for the first and second nodes. Doing so may determine whether the two nodes experience similar problems. In one embodiment, the upgrade system may compare the state vector of the first node before the upgrade event to determine whether the first node was experiencing a problem that the second node is currently experiencing. For example, before the upgrade event, the first node may have similar error and drop rates as the second node is currently experiencing. Or the health status or telemetry data of the first node may have been similar to the current health status and telemetry data of the second node. Further, the number of neighbor node failures for the first and second node may have been similar. Thus, by comparing state vectors, the upgrade system can determine whether the second node is experiencing a problem that the first node (or a neighbor to the first node) was experiencing before the upgrade event.

Moreover, the upgrade system can predict a future problem with the second node by comparing the vectors of the first and second nodes. For example, even if the current drop and error rates and overall health of the second node is good at the moment, because the second node has a similar location in the second fabric as the first node has in the first fabric, or because the second node has similar features enabled as the first node, the upgrade system may predict that the likelihood of the second node experiencing a similar problem which resulted in upgrading the first node is high.

Using the different comparison techniques described above, the upgrade system identifies the second node as being sufficiently similar to the first node. In one embodiment, the upgrade system uses the techniques above to generate another confidence metric (referred to herein as a similarity confidence metric). The similarity confidence metric can be a single value (e.g., a percentage) representing the confidence the upgrade system has that applying the upgrade performed on the first node to the second node will be beneficial because of the similarities between these nodes. For example, the upgrade system may compare the vector(s) of the first node to all the vector(s) of the nodes in the second fabric to generate respective similarity confidence metrics for all the nodes in the second fabric. For the nodes in the second fabric that have similarity confidence metrics that satisfy a predefined threshold, the method 200 proceeds to block 230 where the upgrade system generates a suggestion to perform the upgrade event on those nodes (which includes the second node).

Although the method 200 describes using the feature and state vectors to identify an upgrade event performed in a first fabric that should be performed to a node in a second fabric (e.g., two fabrics for two different entities, or two fabrics at two different geographical locations), this is not a requirement. The upgrade system could use method 200 to identify a second node within the same fabric as the first node that is similar to the first node (e.g., using the techniques described in block 225). That is, the upgrade system could compare the feature and state vectors to feature and state vectors in all the other nodes in the same fabric to identify similar nodes and suggest performing the same upgrade event to those nodes. However, one advantage of using the method 200 is that the system administrator of the second fabric may not trust the upgrade event performed in the first fabric. Providing the reliability confidence metric generated at block 215 and listing the similarities between the first and second node identified at block 225 (or the similarity confidence metric) may alleviate the system administrator's concern and convince her that performing the same upgrade will result in a beneficial outcome.

Moreover, while method 200 describes generating a suggestion to the system administrator, in other embodiments, the method 200 may include automatically performing the upgrade on the second node without human intervention. That is, once the upgrade system performs blocks 205-225 and determines that the reliability confidence score satisfies the threshold and identifies the second node using vector comparison, the upgrade system can automatically perform the same upgrade to the second node without waiting for permission by the system administrators. This may be performed when the first and second nodes are in the same network fabric that are controlled by the same system administrators rather than in two fabrics managed by different administrators.

Figure 3:
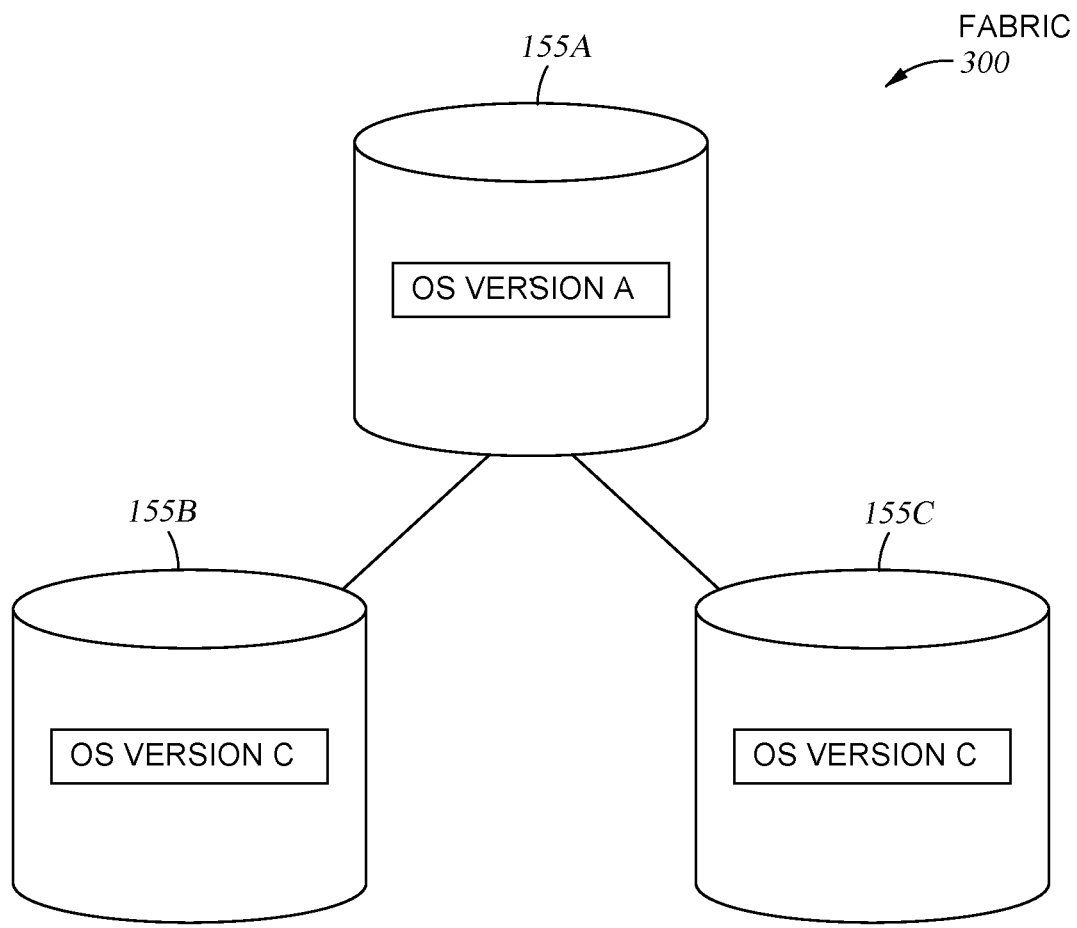
FIG. 3 illustrates a displayed suggestion for upgrading an operating system in a network device, according to one embodiment described herein.
Figure 3:
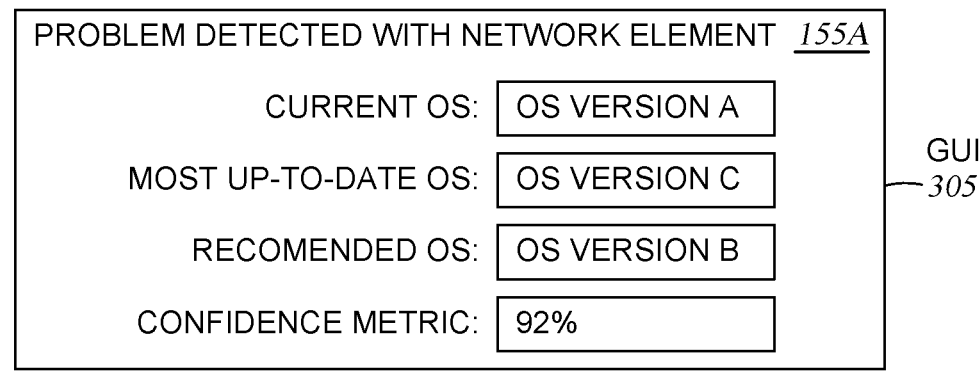

FIG. 3 illustrates a displayed suggestion for upgrading an operating system in a network device, according to one embodiment described herein. That is, FIG. 3 illustrates one example of performing the method 200 in FIG. 2 to output a suggestion for upgrading a network node.

FIG. 3 illustrates a network fabric 300 with three network elements 155. The network element 155A has OS version A while the network elements 155B and 155C have OS version C. FIG. 3 also illustrates a GUI 305 that may be displayed to the system administrator after performing the method 200 in FIG. 2. The GUI 305 indicates that there may be a current problem, or a potential (i.e., predicted) problem, with the network element 155A. For example, the upgrade system (or another troubleshooting application) may monitor the state vector or logs corresponding to the network element 155A and determine it is currently underperforming. In this case, identifying the problem in the network element 155A may cause the upgrade system to perform blocks 210-225 to identify a similar node (e.g., the first node) which has been previously upgraded and could solve the problem currently experienced by the second node.

Alternatively, as discussed above, the upgrade system could have determined that the network element 155A is similar to another network element in a different fabric (by comparing the feature/state vectors) which was experiencing a problem, and thus, predict that the network element 155A will have the same problem in the future.

In any case, the upgrade system suggests, using the GUI 305 to update the OS in the network element 155A from version A to version B. That is, even though version C is the most up-to-date OS, the upgrade system suggests that upgrading from version A to version B will be the most beneficial. For example, in another fabric, the upgrade system may have detected that upgrading a network node to OS version B when that node is coupled to neighboring nodes executing OS version C, is a beneficial upgrade (e.g., has a high history confidence metric). For instance, upgrading a node to OS version B may have a higher reliability confidence metric than upgrading a node to OS version C when the neighboring nodes are also executing OS version C. For example, there could be a current bug in OS version C where executing that version of the OS on two neighboring nodes leads to lower performance than using OS version C on one node and OS version B on the other node.

The GUI 305 can also indicate a confidence metric associated with the upgrade. This confidence score could be the reliability confidence metric, the similarity confidence metric, or a combination of both. Although displaying the confidence metric is optional, doing so allows the system administrator to see how confident the upgrade system is that that upgrade will be beneficial. Moreover, in one embodiment, the administrator activates a feature in the GUI 305 that displays more information about how the confidence metric was generated, such as the similarities between the network element 155A and the node in the other fabric where the upgrade has already occurred, how long ago the other node was upgraded, the increase in performance the upgrade had on the other node, the location of the other node in its fabric, information about the other node, and the like. Thus, the system administrator can review the basis for the confidence metric (perhaps she values some of this information more important or less important than the confidence calculator that generated the metric) when making her decision whether to upgrade the network element 155A.

Figure 4:
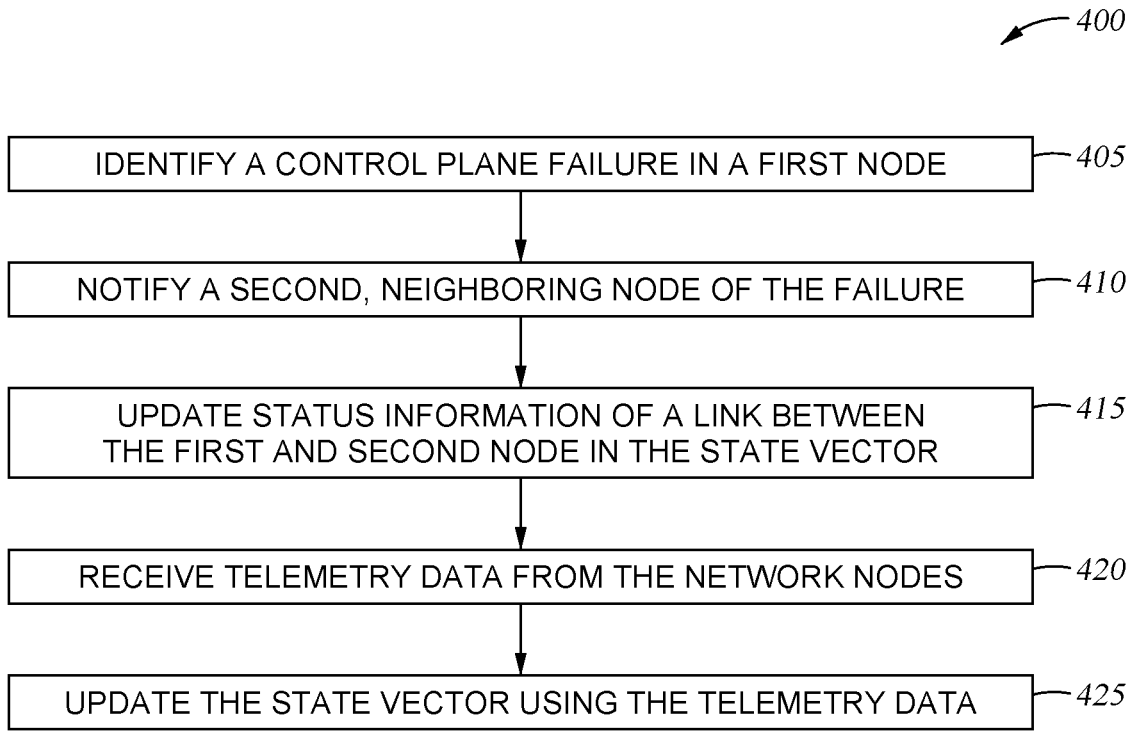
FIG. 4 is a flowchart for updating vectors corresponding to the network elements, according to one embodiment described herein.

FIG. 4 is a flowchart of a method 400 for updating vectors corresponding to the network elements, according to one embodiment described herein. Specifically, method 400 illustrates communicating neighbor node failures between nodes and updating telemetry data in the state vectors.

At block 405, a first node identifies a control plane failure. Although a control plane failure is specifically mentioned, the first node may also track other types of failures such as internal hardware failures, software crashes, and the like.

At block 410, the first node notifies a second, neighboring node of the failure along with a timestamp of the failure. That is, rather than simply logging the failure in logs associated with the first node, or providing a notification of the failure to a SDN controller, the first node pushes a notification of the failure to a neighboring node (or all its neighboring nodes). The neighboring node can then pass this information to the upgrade system (if the upgrade system rather than the nodes themselves store and update the state vectors).

At block 415, the second neighboring node updates status information of a link between the first and second node in the state vector. This status information tracks the neighboring node failures where neighboring nodes provide failure information to each other that can be used to characterize the link between these nodes. For example, tracking the number or rate of the control plane failures can indicate the health of the link or links between the neighboring nodes. As described above, the confidence calculator can use the neighbor node failures in the state vectors to generate confidence metrics corresponding to the nodes.

At block 420, the upgrade system receives telemetry data from the network nodes. Generally, telemetry data indicates the current state of the fabric, and more, specifically, the state of the network element or node in the fabric. The nodes or network elements can publish their telemetry data to the upgrade system, which acts like a collector for that data.

At block 425, the upgrade system updates the state vectors using the telemetry data received from the nodes in the fabric.

Figure 5:
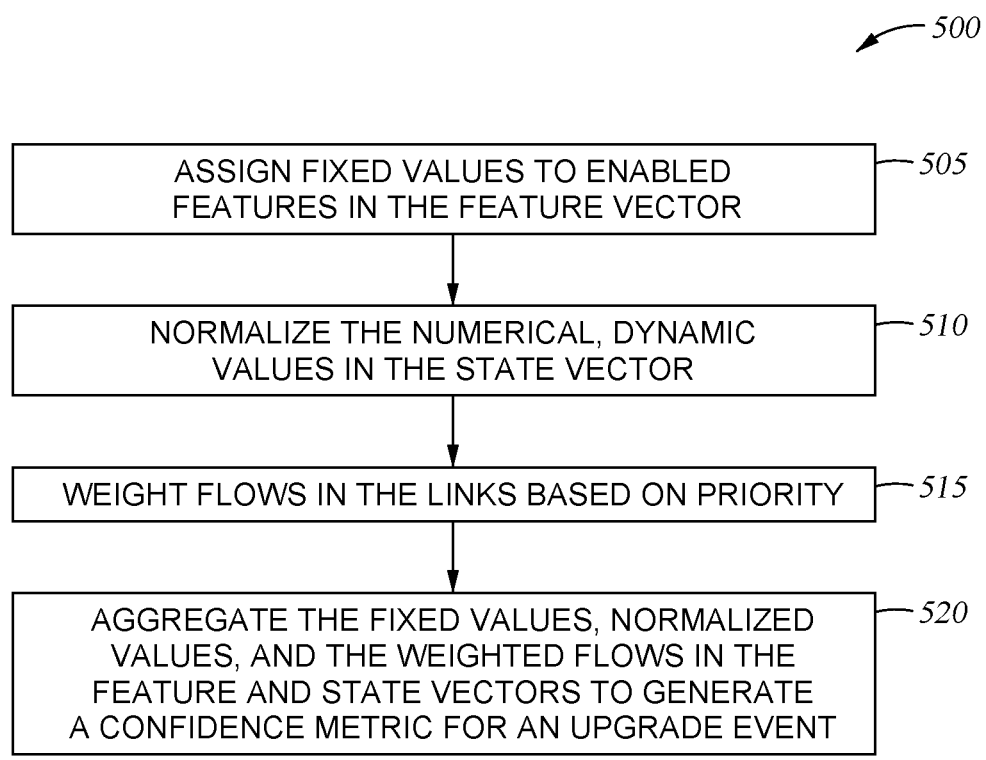
FIG. 5 is a flowchart for generating a confidence score, according to one embodiment described herein.

FIG. 5 is a flowchart of a method 500 for generating a confidence score, according to one embodiment described herein. In one embodiment, the method 500 describes techniques for generating a reliability confidence score used to represent how successful the upgrade event was at improving the performance or life cycle of the upgraded node. For example, the method 500 may be used at block 225 of method 200 in FIG. 2.

At block 505, the confidence calculator assigns fixed values to the enabled features in the feature vector. That is, the enabled features (e.g., enabled ports or interfaces) may be given a first value while the disabled features are given a different value, or no value. In one embodiment, all the enabled features are given the same value.

At block 510, the confidence calculator normalizes the numerical, dynamic values in the state vector. That is, the confidence calculator may choose a chunk or range of time to use when normalizing the dynamic values. These values can be error rates, failure events, drop rates, and the like. In addition to normalizing these values, the confidence calculate can normalize the bandwidth or throughput of the network element using the max bandwidth/throughput for the various interfaces. Since these values likely change much more frequently than the information stored in the feature vector, normalizing these values helps the confidence calculator to compare the values to each other when generating a confidence metric and determining whether an upgrade event was successful.

At block 515, the confidence calculator weights flows in the links connected to the node based on priority. For example, higher priority links may be given greater scores (and thus, have a greater impact on the confidence score) than lower priority links. Thus, if an upgrade event improves the performance of a higher priority link more than a lower priority link, this may result in a higher confidence score when compared to an upgrade event that improves the performance of a lower priority link more than a higher priority link.

At block 520, the confidence calculator aggregates the fixed values, normalized values, and the weighted flows in the feature and state vectors to generate a confidence metric for an upgrade event. The confidence metric can be represented as an absolute score, a percentage, or other means.

In one embodiment, portions of the method 500 are also used when comparing vectors between first and second network elements to identify similarities between those network elements. For example, if the two network elements have the same enabled features, the same hardware or software applications, the same locations in the fabric, similar errors rates, or similar neighboring nodes failures, the similarity confidence metric can be increased, indicating that a beneficial upgrade performed on the first network element will likely be beneficial to the second network element.

Figure 6:
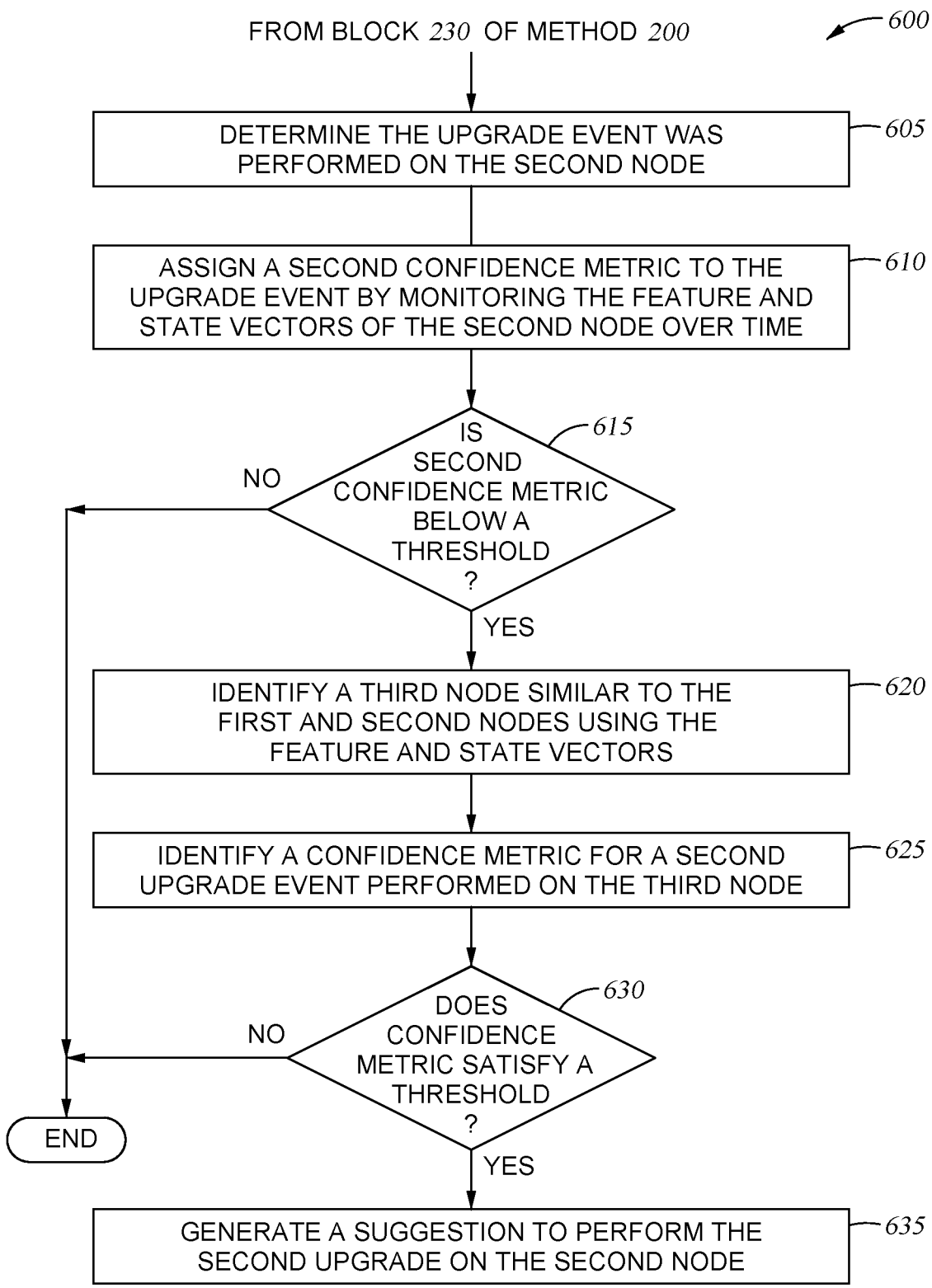
FIG. 6 is flowchart for suggesting multiple upgrades to a network element, according to one embodiment described herein.

FIG. 6 is flowchart of a method 600 for suggesting multiple upgrades to a network element, according to one embodiment described herein. The method 600 begins after block 230 of method 200 where the upgrade system has suggested performing the same upgrade that was performed on a first node to a second node.

At block 605, the upgrade system determines the upgrade event was performed on the second node. That is, the system administrator was convinced that performing the upgrade that was performed on the first node would improve the performance of the second node. The second node (or a SDN controller) may inform the upgrade system when the second node was upgraded.

At block 610, the confidence calculator assigns a second confidence metric (e.g., a second reliability confidence metric) to the upgrade event performed on the second node by monitoring the feature and state vectors of the second node over time. The confidence calculator can perform the same techniques discussed above in block 215 and method 500 to generate the second reliability confidence metric.

At block 615, the upgrade system determines whether the second reliability confidence metric is below a threshold. In one embodiment, the threshold represents a minimum confidence that the upgrade system must have that the upgrade was beneficial to the second node and can be the same threshold used in block 220 of method 200.

If the confidence metric is above this threshold (i.e., the upgrade event was beneficial to the second node), this means the upgrade event was a success and the method 600 ends. However, if the confidence metric is below this threshold, this indicates that upgrading the second node was not as successful as predicted by the upgrade system. That is, despite the upgrade being beneficial for the first node, and the high degree of similarity between the first node and the second node, upgrading the second node was not as beneficial to the second node as it was to the first node for whatever reason.

The method 600 then proceeds to block 620 where the upgrade system identifies a third node similar to the first and second nodes using the feature and state vectors. To do so, the upgrade system can use the same techniques described in block 225 of method 200 to identify the second node. The third node may be in one of the fabrics as the first and second nodes or in a different fabric.

At block 625, the confidence calculator identifies a confidence metric for a second upgrade event performed on the third node. That is, the confidence calculator can generate a reliability confidence metric for the second upgrade event (which is different that the upgrade already performed on the first and second nodes) using the feature and state vectors of the third node.

At block 630, the upgrade system determines whether the confidence metric for the second upgrade event satisfies a threshold. This threshold can be the same threshold used at block 615 to determine whether an upgrade event is beneficial to a node. If the confidence metric of the second upgrade event satisfies the threshold, the method 600 proceeds to block 635 where the upgrade system generates a suggestion to perform the second upgrade on the second node. That is, method 600 can be used to identify when a first upgrade was not successful (or not sufficiently beneficial) to the second node, search for another node (e.g., the third node) where a different upgrade was performed, and then suggest to the system administrator to perform the different upgrade on the second node given the similarities between the second node and the third node. Thus, if first upgrade does not work, the upgrade system can use method 600 to search for a different upgrade to try.

In one embodiment, the system upgrade generates a global confidence score for a upgrade event using separate reliability confidence metrics. In the examples above, the upgrade system generated two reliability confidence metrics for the same upgrade event: when the upgrade event was performed on the first node and on the second node. These confidence metrics can be aggregated (e.g., averaged) to yield a global reliability confidence metric for the upgrade. As the number of nodes that perform the upgrade event and benefit from it increases, the global reliability confidence metric increases. However, because the upgrade event may not have benefited the second node, the reliability confidence metric generated at block 610 may reduce the global confidence metric for the upgrade event. In one embodiment, the upgrade system can use the global reliability confidence metric when deciding whether an upgrade event should be recommended for other nodes in the same of different network fabrics at block 220 in the method 200.

Figure 7:
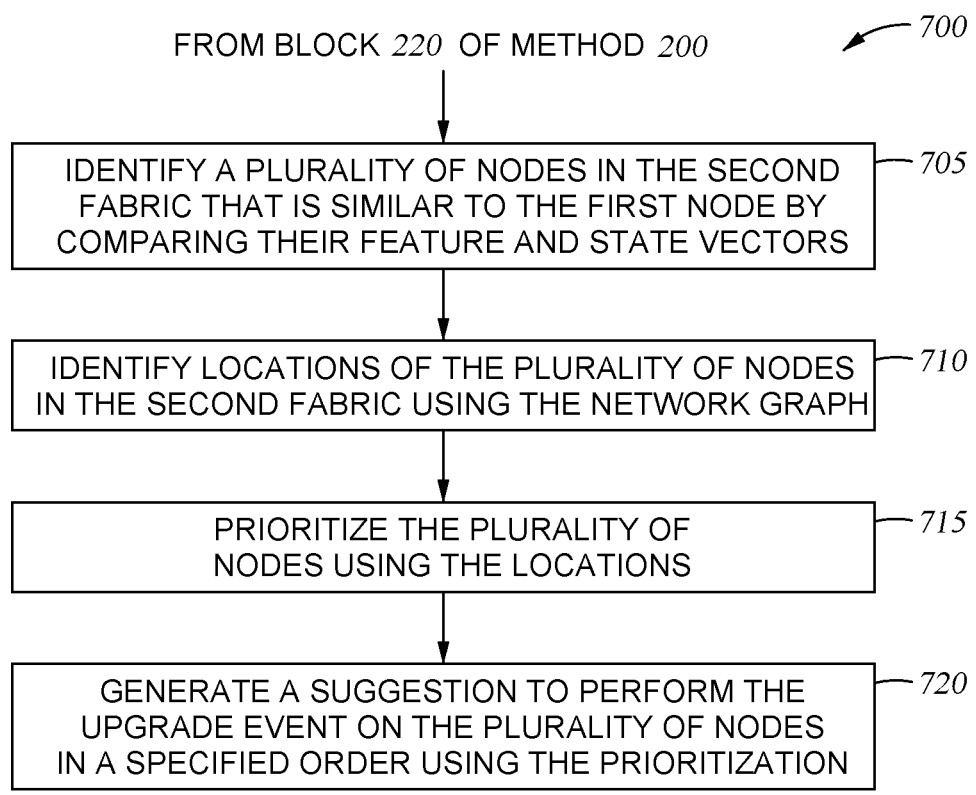
FIG. 7 is a flowchart for suggesting an order in which multiple upgrades should be performed, according to one embodiment described herein.

FIG. 7 is a flowchart of a method 700 for suggesting an order in which multiple upgrades should be performed, according to one embodiment described herein. The method 700 begins after block 220 of method 200 where the upgrade system has determined that the confidence score corresponding to the upgrade event performed on the first node satisfies the threshold.

At block 705, the upgrade system identifies a plurality of nodes in the second fabric that is similar to the first node by comparing their features and state vectors. That is, rather than identifying just one similar node in the second fabric, in this embodiment, the upgrade system identifies multiple similar nodes. For example, the upgrade system may have generated a similarity confidence metric for all the nodes in the second fabric relative to the first node and identified a subset of nodes that have confidence metrics above a threshold.

At block 710, the upgrade system identifies locations of the plurality of nodes in the second fabric using the network graph. For example, the upgrade system may use the network graph to classify a type of node (e.g., core, edge, interface, spine, leaf, etc.).

At block 715, the upgrade system prioritizes the plurality of nodes using the locations. For example, some types of nodes may be more important to the functioning of the fabric than other. For example, if an edge network element coupled to a handful host devices experiences a network problem, this may have less of an impact than a core network element which facilitates communication between many different network elements.

In one embodiment, the upgrade system considers other factors when prioritizing the plurality of nodes. The upgrade system may consider the priority of the flows and the types of applications executing on the nodes.

At block 720, the upgrade system generates a suggestion to perform the upgrade event on the plurality of nodes in a specified order using the prioritization. That is, the upgrade system may suggest that the system administrator upgrade the higher priority nodes before the lower priority nodes. However, in another embodiment, since the system administrator may be uncertain whether performing the upgrade will be more detrimental than helpful, the upgrade system can suggest that the administrator instead upgrade the lower priority nodes first. Doing so enables the administrator to first test the upgrade on a lower priority node that is likely to have the least impact on the overall fabric if the upgrade reduces, rather than improves, performance. Once the upgrade is vetted on the lower priority node, the system administrator can then upgrade the higher priority nodes.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
generating at least one vector for each of a plurality of network elements, wherein each of the at least one vector indicates features enabled in a respective network element and status information of a link coupling the respective network element to a neighboring network element;
identifying an upgrade event at a first network element of the plurality of network elements;
generating a confidence metric corresponding to the upgrade event from monitoring the at least one vector of the first network element over time, wherein the confidence metric represents a reliability of the upgrade event, and wherein generating the confidence metric comprises:
generating normalized values in the at least one vector defining a health state of the link coupling the first network element to the neighboring network element according to a predefined time period, wherein generating the normalized values comprises:
selecting a range of time with dynamic values to be normalized;
identifying the dynamic values of the at least one vector, which include at least one of error rates, failure events, drop rates, bandwidth of the network element, or throughput of the network element; and
normalizing the dynamic values;
determining that the confidence metric satisfies a threshold confidence value;

identifying a second network element in the plurality of network elements that is similar to the first network element by comparing the at least one vector of the first network element to the at least one vector of the second network element; and
generating a suggestion to perform the upgrade event on the second network element.

2. The method of claim 1, wherein the first network element and the second network element are in different client fabrics.

3. The method of claim 1, wherein generating the at least one vector for each of the plurality of network elements comprises:
detecting a failure in the neighboring network element;
notifying the respective network element of the failure along with a timestamp of the failure; and
updating the status information of the link stored in the at least one vector of the respective network element in response to receiving the notification.

4. The method of claim 3, wherein each of the at least one vectors further comprises a version of an operating system (OS) currently operating in the respective network element and a priority of at least one flow in the link,
wherein generating the confidence metric is based on the failure in the neighboring network element, the OS, and the priority of the at least one flow.

5. The method of claim 1, wherein each of the at least one vectors comprises a first vector defining the features enabled in the respective network element and version information of a software application in the respective network element, and a second vector defining the health state of the respective network element that comprises the status information of the link.

6. The method of claim 5, wherein generating the confidence metric corresponding to the upgrade event further comprises:
aggregating the normalized values and the features enabled in the respective network element to generate the confidence metric.

7. The method of claim 1, further comprising:
determining that the upgrade event was performed at the second network element;
generating a second confidence metric corresponding to the upgrade event at the second network element from monitoring the at least one vector of the second network element over time, wherein the second confidence metric represents the reliability of the upgrade event when performed on the second network element;
upon determining the second confidence metric does not satisfy a second threshold confidence value, identifying a third network element that is similar to the first and second network elements by comparing the at least one vectors of the first and second network elements to a vector of the third network element;
identifying a second upgrade event performed at the third network element different from the upgrade event; and
upon determining a confidence metric of the second upgrade event satisfies a third threshold confidence value, generating a suggestion to perform the second upgrade event on the second network element.

8. The method of claim 7, further comprising:
combining the confidence metric and the second confidence metric to yield a global confidence metric for the upgrade event.

9. The method of claim 1, further comprising:
identifying a multiple network elements in the plurality of network elements that are similar to the first network element, wherein the second network element is one of
the multiple network elements;
identifying locations of the multiple network elements in
a network fabric based on a network graph of the
network fabric;
prioritizing the multiple network elements using their
locations; and
generating the suggestion to perform the upgrade event on
the multiple network elements in an order derived from
prioritizing the multiple network elements.

10. A system comprising:
a first fabric comprising a first plurality of interconnected
network elements;
a second fabric comprising a second plurality of interconnected network elements; and
an upgrade system configured to:
  generate at least one vector for each of the first and
    second pluralities of interconnected network elements, wherein each of the at least one vector
    indicates features enabled in a respective network
    element and status information of a link coupling the
    respective network element to a neighboring network element,
  identify an upgrade event at a first network element of
    the first plurality of interconnected network elements,
  generate a confidence metric corresponding to the
    upgrade event from monitoring the at least one
    vector of the first network element over time,
    wherein the confidence metric represents a reliability
    of the upgrade event, and wherein generating the
    confidence metric comprises:
    generating normalized values in the at least one
      vector defining a health state of the link coupling
      the first network element to the neighboring network element according to a predefined time
      period, wherein generating the normalized values
      comprises:
      selecting a range of time with dynamic values to
        be normalized;
      identifying the dynamic values of the at least one
        vector, which include at least one of error rates,
        failure events, drop rates, bandwidth of the
        network element, or throughput of the network
        element; and
      normalizing the dynamic values;
  determine that the confidence metric satisfies a threshold confidence value,
  identify a second network element in the second plurality of interconnected network elements that is
    similar to the first network element by comparing the
    at least one vector of the first network element to the
    at least one vector of the second network element,
    and
  generate a suggestion to perform the upgrade event on
    the second network element.

11. The system of claim 10, wherein the first fabric and
second fabric are different client fabrics communicatively
coupled to the upgrade system.

12. The system of claim 10, wherein generating the at
least one vector for each of the first and second pluralities of
interconnected network elements comprises:
  detecting a failure in the neighboring network element;
  notifying the respective network element of the failure
    along with a timestamp of the failure; and
  updating the status information of the link stored in the at
    least one vector of the respective network element in
    response to receiving the notification.

13. The system of claim 12, wherein each of the at least
one vectors further comprises a version of an operating
system (OS) currently operating in the respective network
element and a priority of at least one flow in the link,
  wherein generating the confidence metric is based on the
    failure in the neighboring network element, the OS, and
    the priority of the at least one flow.

14. The system of claim 10, wherein each of the at least
one vectors comprises a first vector defining the features
enabled in the respective network element and version
information of a software application in the respective
network element, and a second vector defining the health
state of the respective network element that comprises the
status information of the link.

15. The system of claim 14, wherein generating the
confidence metric corresponding to the upgrade event further comprises:
  aggregating the normalized values and the features
    enabled in the respective network element to generate
    the confidence metric.

16. The system of claim 10, wherein the upgrade system
is configured to:
  determine that the upgrade event was performed at the
    second network element;
  generate a second confidence metric corresponding to the
    upgrade event at the second network element from
    monitoring the at least one vector of the second network element over time, wherein the second confidence
    metric represents the reliability of the upgrade event
    when performed on the second network element;
  upon determining the second confidence metric does not
    satisfy a second threshold confidence value, identify a
    third network element that is similar to the first and
    second network elements by comparing the at least one
    vectors of the first and second network elements to a
    vector of the third network element;
  identify a second upgrade event performed at the third
    network element different from the upgrade event; and
  upon determining a confidence metric of the second
    upgrade event satisfies a third threshold confidence
    value, generate a suggestion to perform the second
    upgrade event on the second network element.

17. The system of claim 16, wherein the upgrade system
is configured to:
  combine the confidence metric and the second confidence
    metric to yield a global confidence metric for the
    upgrade event.

18. The system of claim 10, wherein the upgrade system
is configured to:
  identify a multiple network elements in the second plurality of interconnected network elements that are similar to the first network element, wherein the second
    network element is one of the multiple network elements;
  identify locations of the multiple network elements in the
    second fabric based on a network graph of the second
    fabric;
  prioritize the multiple network elements using their locations; and
  generate the suggestion to perform the upgrade event on
    the multiple network elements in an order derived from
    prioritizing the multiple network elements.

19. A non-transitory computer-readable medium having
program instructions embodied therewith, the program instructions executable by a processor to perform an operation, the operation comprising:
  generating at least one vector for each of a plurality of network elements, wherein each of the at least one vector indicates features enabled in a respective network element and status information of a link coupling the respective network element to a neighboring network element;
  identifying an upgrade event at a first network element of the plurality of network elements;
  generating a confidence metric corresponding to the upgrade event from monitoring the at least one vector of the first network element over time, wherein the confidence metric represents a reliability of the upgrade event, and wherein generating the confidence metric comprises:
    generating normalized values in the at least one vector defining a health state of the link coupling the first network element to the neighboring network element according to a predefined time period, wherein generating the normalized values comprises:
      selecting a range of time with dynamic values to be normalized;
      identifying the dynamic values of the at least one vector, which include at least one of error rates, failure events, drop rates, bandwidth of the network element, or throughput of the network element; and
      normalizing the dynamic values;
  determining that the confidence metric satisfies a threshold confidence value;
  identifying a second network element in the plurality of network elements that is similar to the first network element by comparing the at least one vector of the first network element to the at least one vector of the second network element; and
  generating a suggestion to perform the upgrade event on the second network element.

20. The non-transitory computer-readable medium of claim 19, wherein the operation further comprises:
  determining that the upgrade event was performed at the second network element;
  generating a second confidence metric corresponding to the upgrade event at the second network element from monitoring the at least one vector of the second network element over time, wherein the second confidence metric represents the reliability of the upgrade event when performed on the second network element;
  upon determining the second confidence metric does not satisfy a second threshold confidence value, identifying a third network element that is similar to the first and second network elements by comparing the at least one vectors of the first and second network elements to a vector of the third network element;
  identifying a second upgrade event performed at the third network element different from the upgrade event; and
  upon determining a confidence metric of the second upgrade event satisfies a third threshold confidence value, generating a suggestion to perform the second upgrade event on the second network element.

* * * * *